(12) United States Patent
Stubbs et al.

(10) Patent No.: US 6,574,066 B1
(45) Date of Patent: Jun. 3, 2003

(54) TIME-BASED OPTICAL SERVO SYSTEM AND METHOD

(75) Inventors: Daniel P. Stubbs, Marine on St. Croix, MN (US); Robert S. Jackson, Little Canada, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/506,470

(22) Filed: Feb. 17, 2000

(51) Int. Cl.[7] .......................... G11B 13/04; G11B 5/596
(52) U.S. Cl. .................. 360/77.03; 360/77.12; 369/44.41; 369/120
(58) Field of Search ................. 369/120, 44.14, 369/44.25, 44.34, 44.37, 44.41; 360/77.03, 78.11, 77.12

(56) References Cited

U.S. PATENT DOCUMENTS

| | | | |
|---|---|---|---|
| 4,117,327 A | * 9/1978 | Lamelot et al. | 250/338.1 |
| 4,558,383 A | 12/1985 | Johnson | |
| 4,835,378 A | * 5/1989 | Coops | 369/44.14 X |
| 4,935,835 A | 6/1990 | Godwin et al. | |
| 4,958,245 A | 9/1990 | Roth et al. | |
| 4,961,123 A | 10/1990 | Williams et al. | 360/77.03 X |
| 5,065,387 A | 11/1991 | Roth et al. | 369/44.41 |
| 5,281,802 A | * 1/1994 | Kitabayashi | 369/44.42 X |
| 5,535,069 A | 7/1996 | Chiao et al. | 360/77.03 |
| 5,563,864 A | 10/1996 | Kobayashi et al. | |
| 5,563,868 A | 10/1996 | Farnsworth et al. | . 360/77.03 X |
| 5,673,241 A | * 9/1997 | Koyama et al. | 369/44.23 |
| 5,689,384 A | 11/1997 | Albrecht et al. | 360/77.12 |
| 6,256,285 B1 | * 7/2001 | Coombs | 369/120 X |

FOREIGN PATENT DOCUMENTS

JP 11-96705 4/1999

OTHER PUBLICATIONS

"LS–120 SuperDisk™ Primer," Dan Stubbs, Jan. 28, 1998, Imation Corp., pp. 1–22.

* cited by examiner

Primary Examiner—Andrew L. Sniezek
Assistant Examiner—James L Habermehl
(74) Attorney, Agent, or Firm—Eric D. Levinson

(57) ABSTRACT

A time-based optical servo system includes at least one optical indicator mark located on at least one servo track of a data storage medium. Alternatively, a pattern of optical indicators is repeatedly recorded in the at least one servo track. A servo read head assembly coupled to a transducing head assembly includes two elongate and non-parallel detection devices having a known relative geometry. The detection devices are adapted to detect the optical indicator marks and determine the time period required for each optical indicator mark to pass between the detection devices. This time period is used to calculate the location of the transducing head assembly relative to the storage medium in a translating direction and produce a position error signal (PES) based thereon.

23 Claims, 3 Drawing Sheets

TIME-BASED OPTICAL SERVO SYSTEM AND METHOD

TECHNICAL FIELD

The present invention relates generally to reading/writing data on a data storage medium. More particularly, the present invention pertains to an optical time-based servo system and method for positioning a transducing head relative to one or more tracks located on a storage medium.

BACKGROUND

Electronic data storage devices are known in the art. In general, these devices are classified by how they read and write data. Magnetic data storage devices use a transducing or "read/write" head that alters the magnetic state of a portion of a magnetic disk or tape. Optical devices, on the other hand, utilize a read/write head having a low-power laser beam to read and write digitized data encoded in the form of tiny changes in reflectivity on the surface of an optical disk.

At higher track densities, the recording and reading of data in tracks on data storage media requires precise positioning of the read/write heads. The read/write heads must be quickly moved to and centered over particular tracks as reading/writing of data is performed. The heads can read/write data from a particular track as the media moves relative to the transducing head in a transducing direction. To access other tracks, the read/write heads move laterally across the media in a translating direction that is generally perpendicular to the track.

In the case of storage devices that read/write data on magnetic and optical media, servo control systems are sometimes used to accurately position the data read/write heads in the translating direction (e.g., across the width of the tape or across the radius of the disk). The servo control system generally provides a position signal from one or more servo read heads that read position control information recorded in one or more servo tracks on the storage medium. The position control information is then used to accurately center the data read/write heads over the data tracks.

One type of servo system relies on signal amplitude to determine position. An example of such an amplitude-based servo system often found in tape drives is referred to as a boundary system. In boundary systems, at least one servo track or servo track pattern extends along the length of the media (e.g., along the tape or along a circumferential segment of the disk). The servo track is laterally divided into two or more regions separated by distinct boundaries. The distinct regions have different properties that can be detected by the servo read head. For example, the regions may be recorded at different frequencies or phases, or they may contain bursts occurring at distinct times. Generally, the servo head elements straddle the boundary between the regions, and the ratio of the optical or magnetic amplitude of the response of the servo head to each region provides the position signal upon which the track-following servo operates.

While effective, boundary type servos are particularly susceptible to errors in position signal. In addition, servo head instabilities, head wear, localized debris on the head or media, and media defects all contribute to temporary or long-term shifts in the spatial response of the servo head to the recorded servo pattern in the servo track. When this occurs, the servo system cannot effectively track.

Another amplitude-based optical servo system is found on removable magnetic disk drives where the disks are provided with an optically readable servo pattern. Here, an optical servo signal is generated by a laser which is attached to a servo head. The laser forms a pattern of offset spots on the disk which are then reflected to various photodetectors. The intensity of reflected light from the spots is altered when the spots are incident on servo indicator marks on the disk surface. As the disk rotates and the marks pass through the spots, the reflected signal oscillates with an amplitude determined by the relative track position (e.g., maximum when the spots are precisely aligned with the marks and minimum when the spots are exactly between the marks).

While more than adequate, amplitude-based servo systems like those described above are necessarily sensitive to fluctuations in the amplitude of the servo position signal. Accordingly, as the servo read head's sensitivity to amplitude is diminished over time, its ability to effectively track is hindered.

To address the problems associated with amplitude based servo systems, time-based systems for magnetic storage media have been described. U.S. Pat. No. 5,689,384 to Albrecht, et al., entitled "Timing Based Servo System For Magnetic Tape Systems," issued Nov. 18, 1997, describes a track following servo control system for use with magnetic media tape systems which derives head position information from one or more specially patterned magnetic servo tracks. The servo patterns are comprised of magnetic transitions recorded at more than one azimuthal orientations in a servo track, such that the timing of the servo position signal pulses derived from reading the servo pattern are decoded to provide a position signal used by the servo system to position data heads over desired data tracks of the storage media.

While such time-based servo systems have numerous advantages over boundary and other amplitude-based servo systems, problems remain. For example, depending upon the type of time-based servo pattern recorded in the servo track and the method of recording such a time-based servo pattern, the system may be sensitive to media speed variations at the time the servo pattern is recorded in the servo track. Thus, specialized servo writing equipment having special speed control features is generally necessary to perform such time-based servo recording. Furthermore, the servo writing equipment must be able to write complex servo patterns to the media.

For these and other reasons, conventional time-based servo systems have proven less than optimal for many applications. What is needed is a time-based servo system and method that overcomes the problems discussed above when used with either optical or magnetic media in either disk or tape formats.

SUMMARY OF THE INVENTION

To overcome these problems, a time-based optical servo systems and methods according to the present invention are provided. In one embodiment of the invention, an optical detection apparatus for use with a data storage device is provided. The apparatus includes a servo read assembly having two or more elongate optical detection devices spaced apart along a transducing direction in a non-parallel relationship.

In yet another embodiment of the invention, a method for positioning a transducing head adjacent a data storage track on a data storage medium is provided. The method includes moving a storage medium in a transducing direction relative to the transducing head where the storage medium has at least one optical indicator mark thereon. The method further includes positioning the transducing head over the storage medium in a translating direction generally perpendicular to the transducing direction, wherein the transducing head is operatively coupled to an optical servo read head assembly having a first elongate detection device and a second elongate detection device arranged in a spaced-apart, non-parallel configuration. The method further includes determining the position of the transducing head in the translating direction by measuring a time period required for the at least one optical indicator mark to pass between the first detection device and the second detection device. The position of the transducing head in the translating direction is adjusted based on the time period.

In still yet another embodiment of the invention, an optical servo system for positioning a transducing head assembly adjacent a surface of a data storage medium is provided where the storage medium moves in a transducing direction relative to the transducing head assembly. The system includes an optical detection apparatus for determining the position of the transducing head assembly relative to the storage medium in a translating direction which is transverse to the transducing direction. The optical detection apparatus has a first elongate detection device and a second elongate detection device where the first and second detection devices are arranged in a substantially fixed, non-parallel relationship. The first and second detection devices are adapted to detect the passage of at least one optical indicator mark located on the storage medium.

A servo control system for positioning a transducing head assembly adjacent a surface of a data storage medium is also provided. The system, in one embodiment, includes a servo read head assembly for reading at least one servo indicator mark recorded on a servo track of the storage medium and generating a read head signal representative of the position of the servo read head assembly relative to the at least one servo indicator mark. The servo read head assembly includes a first elongate detection device and a second elongate detection device where the first and second detection devices are arranged in a fixed but non-parallel geometric relationship. The system also has a servo decode circuit to receive the read head signal and generate a position signal based thereon, the position signal indicating the position of the servo read head assembly relative to the at least one servo indicator mark. The servo decode circuit receives the read head signal generated from the servo read head assembly as the servo read head assembly is moved in a transducing direction along the storage medium.

In still yet another embodiment of the present invention, a magnetic data storage device is provided. The storage device includes a housing for receiving and mobilizing a magnetic data storage medium therein and a servo control system for positioning a magnetic read or write head adjacent a surface of the storage medium. The servo control system includes a servo read head assembly for reading at least one servo indicator mark recorded on a servo track of the storage medium and generating a read head signal representative of the position of the servo read head assembly relative to the at least one servo indicator mark. The servo read head assembly also includes a first elongate detection device and a second elongate detection device where the first and second detection devices are arranged in a fixed but non-parallel geometric relationship. The system also includes a servo decode circuit to receive the read head signal and generate a position signal based thereon. The position signal indicates the position of the servo read head assembly relative to the at least one servo indicator mark. The servo decode circuit receives the read head signal generated from the servo read head as the servo read head is moved in a transducing direction relative to the storage disk.

Advantageously, the optical servo system of the present invention provides numerous benefits over other time-based and amplitude-based systems. For instance, the time-based system of the present invention is considerably less sensitive to fluctuations in contrast of the media surface. Furthermore, the optical indicator pattern on the media is less complex to produce. In addition, the signal processing is less complex than that required for amplitude-based systems.

BRIEF DESCRIPTION OF THE DRAWINGS

The invention described herein will be further characterized with reference to the drawings, wherein.

DETAILED DESCRIPTION OF THE EXEMPLARY EMBODIMENTS

Magnetic and optical storage devices are available in a wide variety of configurations. Examples of magnetic storage devices include conventional floppy disk drives, hard disk drives, removable media drives (e.g., SuperDisk™ LS-120 high capacity diskette drives sold by Imation, assignee herein), as well as various tape drive systems. Examples of optical storage devices include CD-ROM drives, DVD drives, and the like. For the sake of brevity, the present invention will be discussed in terms of a system for reading removable magnetic disks unless otherwise specified. However, the invention is not to be construed as limited to the described embodiments but rather should be understood to apply to most any magnetic or optical media storage system.

Figure 1:
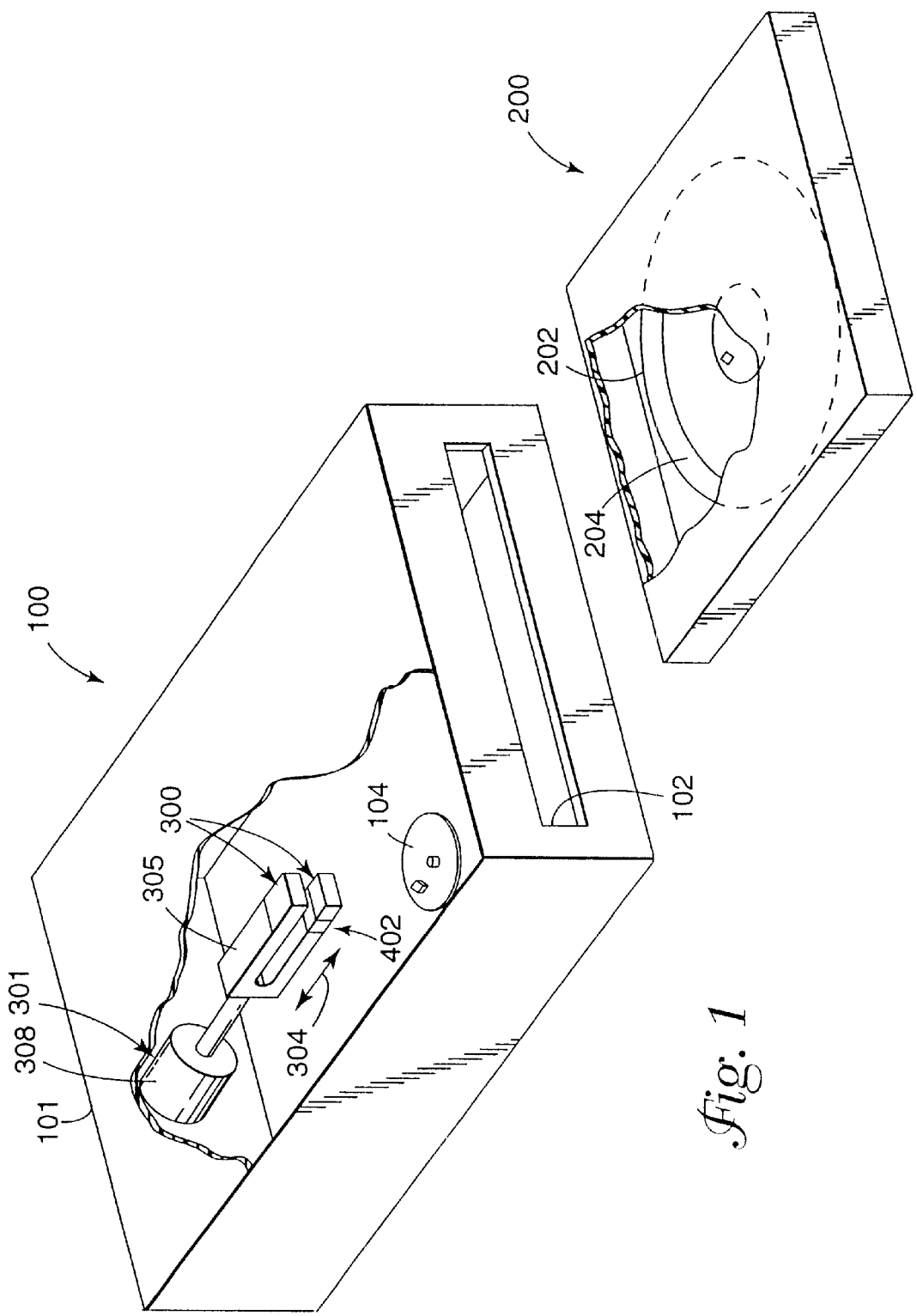
FIG. 1 is a perspective view of a disk drive assembly with a removable disk in accordance with one embodiment of the invention.

FIG. 1 illustrates an exemplary embodiment of a magnetic disk drive assembly 100 in accordance with one embodiment of the invention. Although the particular construction of the drive assembly 100 is, for the most part, not central to the invention, the basic components will be described. The assembly 100 includes a housing 101 having an opening 102 for receiving a removable disk assembly 200. The disk assembly 200 includes one or more storage media such as media storage disks 202 therein. A spindle motor 104 is provided within the housing 101 to rotate the disk 202 during operation.

A transducing head assembly 300 is also located within the drive housing 101. The transducing head assembly 300 permits the drive assembly 100 to read magnetically encoded information from and write magnetically encoded information to the disk 202. To read and write all areas of the disk 202, a position mechanism 301 is provided. While the exact configuration of the positioning mechanism may certainly vary, the exemplary embodiment shown in FIG. 1 is a linear actuator assembly 308 which moves a slide 305 relative to the disk 202. The assembly 300 is attached to the end of the slide 305.

Figure 2:
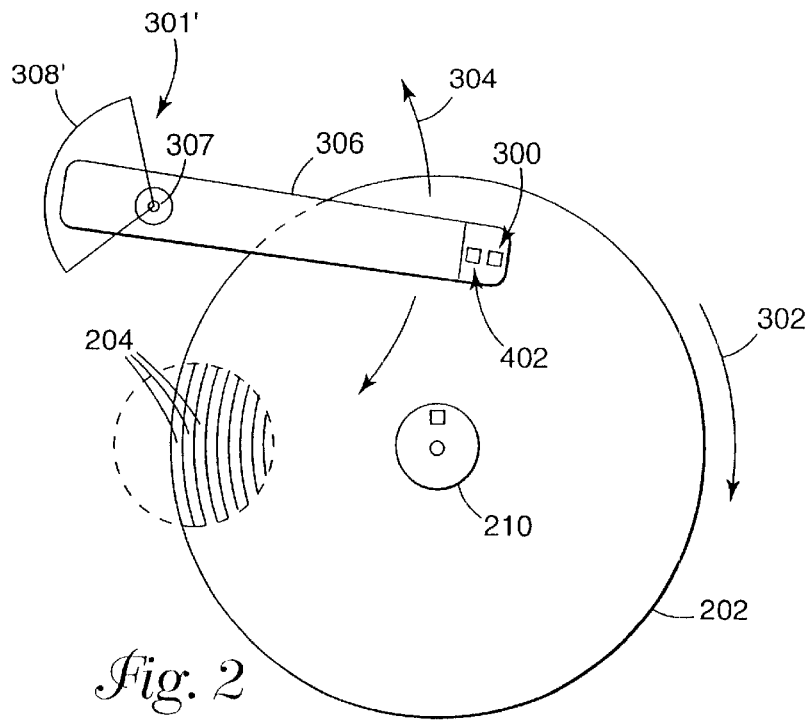
FIG. 2 is an enlarged partial plan view of a disk drive assembly illustrating a position mechanism in accordance with one embodiment of the invention.

Another position mechanism 301' is shown in FIG. 2. Here, the assembly 300 is attached to the end of a beam 306 that pivots about a pivot joint 307. The beam 306 is selectively pivoted about the pivot joint 307 by an actuator assembly 308' that is, in one embodiment, a voice coil motor. FIG. 2 further indicates motion of the transducing head assembly 300 relative to the disk 202 which is hereinafter referred to as the first travelling or "transducing direction" 302. The actuator 308' pivots the beam 306 to move the transducing head 300 across the disk 202 in a generally radial direction substantially perpendicular to the transducing direction. This second direction will hereinafter be referred to as the "translating direction" as indicated by arrows 304 in both FIGS. 1 and 2. While mechanisms 301 and 301' are illustrated, most any mechanism that can move the transducing head assembly 300 in the translating or radial direction can be used without departing from the scope of the invention.

FIG. 2 further illustrates the organization of data on the disk surface. As shown, the surface of the disk 202 is configured into a series of circumferential "rings" or tracks 204 that extend from the outer edge of the disk to the disk hub 210. The data stored on the disk 202 is allocated to one or more particular data tracks 204. To read from or write to the disk 202, the transducing head assembly 300 is placed directly over the center of the desired track 204 and a read or write operation is executed as is generally known in the art. By moving the transducing head in the translating direction 304 while the disk 204 rotates in the transducing direction 302, the transducing head assembly 300 may be placed adjacent any track 204 on the surface of the disk 202.

The capacity of the disk 202, while dependent on many factors, is primarily limited by the number of tracks 204 located on the disk surface. By increasing the number of tracks per inch (TPI), the disk capacity is proportionally increased. Unfortunately, as TPI increases, the individual tracks become smaller, requiring more precise positioning of the transducing head assembly 300.

To achieve precision control of the transducing head assembly 300, a servo control system is utilized. Generally speaking, the servo control system uses a servo read head assembly to read servo information located on the disk. The servo read head assembly is coupled or otherwise calibrated to the transducing head assembly 300 so that the servo read head assembly generates a position signal indicative of the position of the transducing head assembly 300 relative to a respective track on the disk. Circuitry within the servo system analyzes the position signal and compares it to the desired command signal. The actuator 308 is then commanded to adjust the position of the assembly 300 until the position signal and the command signal are generally equal (i.e., error signal equals zero).

Figure 3:
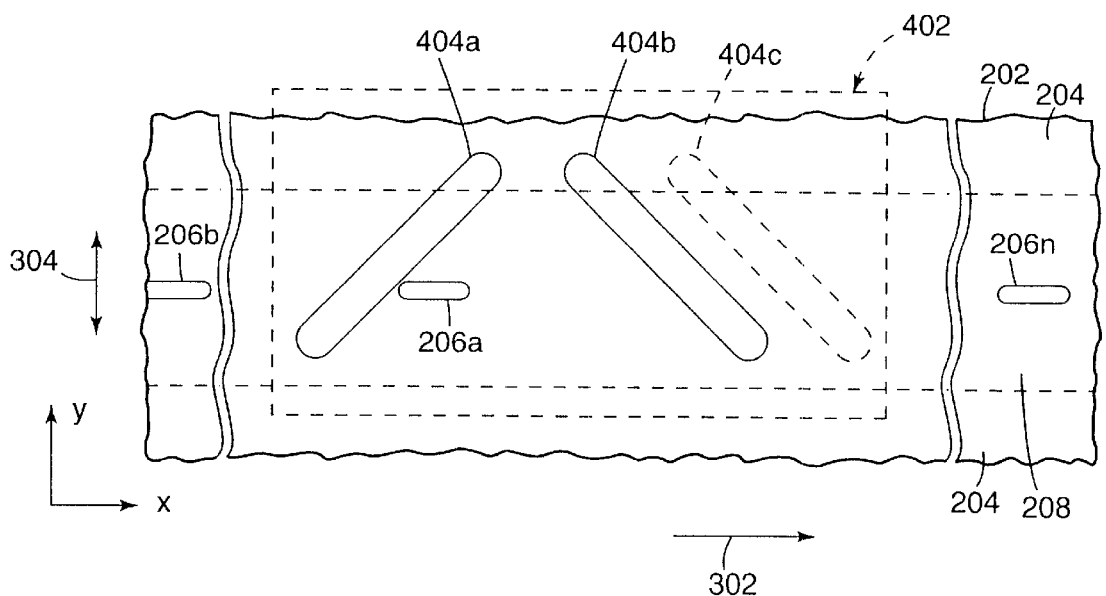
FIG. 3 is a diagrammatic plan view of a servo read head assembly in accordance with one embodiment of the invention.

Attention is now directed to an optical servo control system 400 in accordance with one or more embodiments of the present invention. As shown in FIG. 3, a servo read head assembly 402 is located adjacent the disk 202. The read head assembly 402 is, in one embodiment, rigidly coupled to the transducing head assembly 300 (see FIGS. 1 and 2) so that the location of the read head assembly 402 can be correlated directly to the location of the transducing head assembly 300. The read head assembly 402 is configured to provide an optical detection apparatus having detection devices 404a and 404b (collectively referred to as 404) that detect the passage of optical indicator marks 206 (which are referred to hereinafter as "stitches" 206a–206n) located on the surface of the disk 202. In general, two detection devices 404a and 404b measure the time period or interval required for a given stitch 206 to pass therebetween. With the disk velocity and the spatial geometry of the devices 404a and 404b known, the time period measured is proportional to a particular "y" position of the head assembly 402 (i.e., in the translating direction 304). Stated another way, the location of the head assembly 402 in the "y" or translating direction can be mathematically determined based on the measured time period required for a single stitch 206 to pass between the optical detection devices 404a and 404b.

Figure 4:
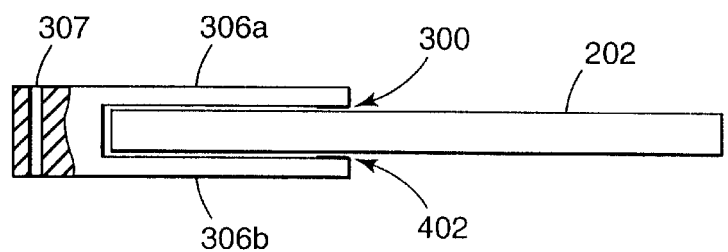
FIG. 4 is a diagrammatic side elevation view further illustrating one embodiment of the position mechanism of FIG. 2.

One exemplary embodiment of a servo control system is shown in FIG. 3. Here, the optical stitches 206 are configured as a series of regular or repeating marks located evenly along the storage medium in a servo track 208. In one configuration, there is a corresponding, generally offset but congruent servo track 208 for each data track 204. In another embodiment, a single servo track 208 could be used with multiple data tracks 204. The servo track is, in one embodiment, a distinct circumferential ring on the disk surface (or, in the case of a tape, a distinct linear segment) separate from the respective data track 204. The servo tracks 208 may be located next to the respective data tracks 204 or, alternatively, on a separate area of the disk or tape. In yet another embodiment, the servo tracks 208 are indistinct from the data tracks 204 (e.g., the stitches 206 are embedded or layered in the data tracks). In still other embodiments, the servo tracks 208 may be located on an opposite side of the disk (or tape) from the data tracks. For example, FIG. 4 shows a side elevation view of the position mechanism of FIG. 2 wherein the beam assembly 306 is U-shaped. A first beam portion 306a supports the transducing head assembly 300 as described above while a second beam portion 306b supports the servo read head assembly 402 and, optionally, another assembly 300 (see FIG. 1) for use with double-sided disks. The disk 202 rides between the first and second beam portions. FIG. 1 also illustrates a servo read head assembly 402 located on an opposite side of the disk 202 from the transducing head assembly 300.

While the stitches 206 (see FIG. 3) can be formed in various ways, they are in one embodiment laser ablated. However, most any process that produces an indicator mark having measurable optical contrast when compared to the regions of the disk surface immediately surrounding the indicator mark is within the scope of the invention. "Measurable optical contrast" is used herein to generally indicate that incident light reflected to or otherwise detected by a photodector from a stitch 206 is measurably different than incident light reflected to or otherwise detected by the photodetector from the surrounding disk surface area. By providing sufficient optical contrast, the optical detection devices 404 are able to detect when a stitch 206 is adjacent thereto. To accurately position the stitches 206 relative to the data tracks on the disk surface, the stitches may be formed simultaneously with the respective data tracks. Alternatively, the stitches 206 may be formed and then used to servo position a magnetic track-writing device to form the data tracks 204. The distance between each optical stitch 206 or series of optical stitches and the respective data tracks 204 is preferably calibrated to correct for differences such as drive/component tolerancing and thermal influences. One such a calibration method is generally described in U.S. patent application Ser. No. 09/506,174, entitled "Optical Servo System for Use with Magnetic Data Storage Tape Having Magnetic Reference Indicators" (filed Feb. 17, 2000.

The optical stitches 206 are detected by the two optical detection devices 404a and 404b which are best illustrated in FIG. 3. While each detection device is shown as forming a linear or straight-line segment, other elongate detection device configurations are also contemplated. The two detection devices 404a and 404b are arranged in a predetermined, non-parallel relationship which, in one embodiment, is configured as a V-shaped pattern symmetric about a line parallel to the transducing direction. The shape of the individual detection devices 404 and their spatial relationship is such that the distance between the two detection devices 404a, 404b at any given y-axis coordinate (i.e., along a line parallel with the transducing direction 302) is unique when compared to the distance between the two detection devices at any other y-axis coordinate. In other words, the distance between the detection devices 404a, 404b varies in the direction 304 (see FIG. 3).

Figure 5A:
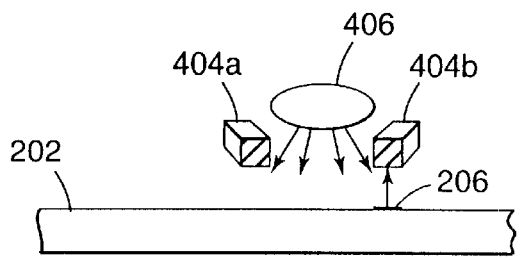
FIG. 5a is an enlarged section view illustrating a servo read head assembly in accordance with another embodiment of the invention.
Figure 5B:
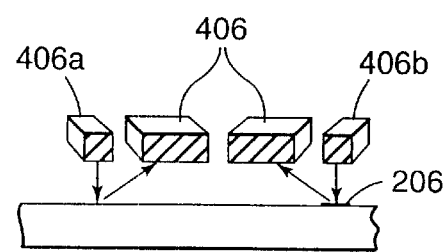
FIG. 5b is an enlarged section view illustrating a servo read head assembly in accordance with yet another embodiment of the invention.

Various configurations of the detection devices 404a and 404b are possible without departing from the scope of the invention. For instance, in one exemplary embodiment generally illustrated in FIG. 5a, a region surrounding the detection devices 404a and 404b is illuminated with an illumination source 406. In this embodiment, the detection devices 404 are configured as photodetectors that detect optical changes only within regions of the disk surface analogous in shape to the devices 404a and 404b. In another embodiment generally illustrated in FIG. 5b, the devices 404a, 404b are configured as illumination sources 406a and 406b which illuminate the media surface 202 in regions analogous in shape to the respective detection devices 404a and 404b. The light reflected from the media surface is then directed to one or more photodetectors 408. The photodetector(s) 408 detects each stitch 206 as it passes through each source 406a and 406b.

While the detection devices 404 are described with reference to particular embodiments, other devices or optical sensing apparatus that are able to detect the stitches 206 in a manner generally similar to that described herein are also contemplated. For example, a single, triangularly-shaped photodetector (not shown) can be imaged on the surface of the disk 202 wherein the stitches 206 are sensed by the non-parallel sides of the triangular photodetector.

Figure 6:
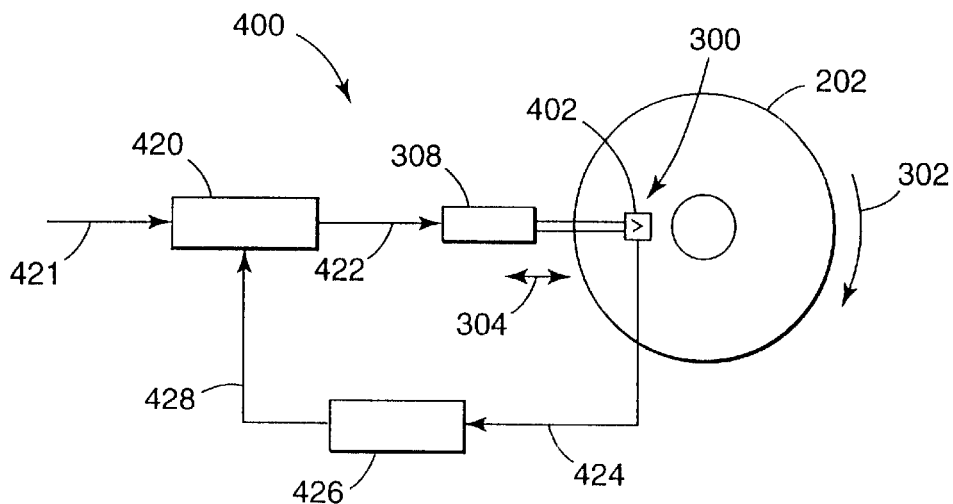
FIG. 6 is a block diagram illustrating the operation of a servo control system in accordance with one embodiment of the invention.

FIG. 6 diagrammatically illustrates a servo control system 400 in accordance with one embodiment of the invention. With the disk 202 in place, an information request input 421 is made to a position controller 420. The information request can include a data write or data read request. After determining which track(s) must be accessed in order to execute the request, the controller 420 sends a position command 422 to the actuator 308. The actuator, in response to the position command, moves the head assembly 402 (and thus the transducing head assembly 300) in the translating direction 304 to the desired track location.

Once the head assembly 402 is positioned, the head assembly 402 determines its precise position by detecting the stitches 206 located in the servo track 208 corresponding to the intended data track 204 (see FIG. 3). Detection circuitry then calculates the time period required for a first optical stitch 206a (see FIG. 3) to traverse the distance from device 404a to 404b. Because of the known geometry of the detection devices 404a and 404b, the position of the servo read head assembly 402 relative to the stitch 206 in the "y" direction may be calculated from the time it takes for the stitch 206 to traverse the distance between the detection devices 404a and 404b. Assuming the relative velocity is known, this relationship is shown in Equation 1.

$$d(y)=(\Delta t)(v)=(t_b-t_a)(v) \qquad \text{Equation 1}$$

where: d(y)=distance traveled by the stitch 206 in the "x" direction which is proportional to the relative location of the stitch 206 in the "y" direction; $t_b$=time which device 404b detects the stitch 206; $t_a$=time which device 404a detects the stitch 206; and v=relative velocity between the servo head assembly and the disk.

Referring still to FIG. 6, the read head assembly 402 generates a read head signal 424 based upon the measured time period. A servo decoder 426 which, in one embodiment, incorporates the detection and servo decode circuitry, analyzes the signal and calculates Δt and thus d(y). The decoder then outputs a signal 428 based upon d(y). The signal 428 is commonly known as a position error signal (PES). The PES 428 is fed back to the controller 420 where it is used to adjust the command signal 422 delivered to the actuator 308. This process is continuously executed to maintain the PES 428 at our substantially near zero. Optionally, the servo decoder 426 may include additional circuitry to, for instance, filter, modulate, or otherwise condition the signal 424.

While the embodiments so far described rely on a known relative velocity between the disk 202 and the servo read head assembly 402, other embodiments of the present invention measure the actual velocity using the stitches 206 and the detection devices 404. As shown in FIG. 3, the read head 402 may include a third detection device 404c substantially identical to the device 404b. The device 404c is equally offset from device 404b such the distance between the devices 404b and 404c at one y-axis coordinate is equidistant to that measured at any other y-axis coordinate. Where the devices 404 are linear segments as shown in FIG. 3, devices 404b and 404c are parallel. Because the distance between detection devices 404b and 404c is always constant, the velocity of the disk 202 relative to the head 402 may be determined by measuring the time period required for the stitch 206 to pass between the parallel detection devices 404b and 404c. Direct measurement of the velocity is advantageous where speed variations are of concern. This measured velocity is then used to normalize velocity in the determination of d(y) as shown in Equation 2.

$$d(y)=(\Delta t)(v)=((t_b-t_a)/(t_c-t_b))(v) \qquad \text{Equation 2}$$

where $t_c$=time which device 404c detects the stitch 206.

Although, the device 404c is shown as parallel to device 404b, other embodiments wherein the device 404c is parallel to device 404a are also possible. Alternatively, embodiments where two separate but parallel detection devices are used to independently measure velocity are also possible.

Advantageously, the optical servo system of the present invention provides numerous benefits over other time-based and amplitude-based systems. For example, the time-based system of the present invention is considerably less sensitive to fluctuations in contrast of the media surface. Furthermore, the optical indicator pattern on the media is less complex to produce. In addition, the signal processing is less complex than that required for amplitude-based systems.

What is claimed is:

1. An optical detection apparatus for use with a data storage device, the apparatus comprising a servo read assembly including two or more elongate optical detection devices non-parallel to one another and spaced apart along a transducing direction, wherein the two or more elongate optical detection devices each detect passage of at least one optical indicator mark located on an adjacent storage medium, wherein the storage medium moves relative to the servo read assembly in the transducing direction and the servo road assembly further moves relative the storage medium in a translating direction generally perpendicular to the transducing direction, and wherein the apparatus further comprises detection circuitry for measuring a time period required for the at least one indicator to pass between the two or more elongate detection devices.

2. The apparatus of claim 1 wherein the detection circuitry determines a position of the servo read assembly in the translating direction based upon the time period.

3. An optical detection apparatus for use with a data storage device, the apparatus comprising a servo read assembly including two or more elongate optical detection devices non-parallel to one another and spaced apart along a transducing direction, wherein the two or more elongate optical detection devices each detect passage of at least one optical indicator mark located on an adjacent magnetic disk.

4. The apparatus of claim 3, wherein each elongate optical detection device includes one or more photodetectors.

5. An optical detection apparatus for use with a data storage device, the apparatus comprising a servo read assembly including two or more elongate optical detection devices non-parallel to one another and spaced apart along a transducing direction, wherein the two or more elongate optical detection devices each detect passage of at least one optical indicator mark located on an adjacent magnetic tape.

6. The apparatus of claim 5, wherein each elongate optical detection device includes one or more photodetectors.

7. An optical servo system for positioning a transducing head assembly adjacent a surface of a data storage medium, the storage medium moving in a transducing direction relative to the transducing head assembly, the system comprising an optical detection apparatus for determining the position of the transducing head assembly relative to the storage medium in a translating direction transverse to the transducing direction, the optical detection apparatus including a fist elongate detection device and a second elongate detection device, the first and second detection devices arranged in a substantially fixed, non-parallel relationship, wherein the first and second elongate detection devices detect passage of at least one optical indicator mark located on the storage medium, wherein a position of the transducing head assembly relative to the storage medium in the translating direction is proportional to a distance between the first detection device and the second detection device measured in the transducing direction.

8. An optical servo system for positioning a transducing head assembly adjacent a surface of a data storage medium, the storage medium moving in a transducing direction relative to the transducing head assembly, the system comprising an optical detection apparatus for determining the position of the transducing head assembly relative to the storage medium in a translating direction transverse to the transducing direction, the optical detection apparatus including a first elongate detection device and a second elongate detection device, the first and second elongate detection devices arranged in a substantially fixed, nonparallel relationship, wherein the first and second elongate detection devices detect passage of at least one optical indicator mark located on the storage medium, wherein the first elongate detection device comprises a first illumination source and the second elongate detection device comprises a second illumination source.

9. The system of claim 8 wherein energy from the first illumination source and the second illumination source is detected by one or more photodetectors.

10. An optical servo system for positioning a transducing head assembly adjacent a surface of a magnetic tape, the magnetic tape moving in a transducing direction relative to the transducing head assembly the system comprising an optical detection apparatus for determining the position of the transducing head assembly relative to the magnetic tape in a translating direction transverse to the transducing direction, the optical detection apparatus including a first detection device and a second detection device, the first and second detection devices arranged in a substantially fixed, non-parallel relationship, wherein the first and second detection devices detect passage of at least one optical indicator mark located on the magnetic tape.

11. An optical detection apparatus for use with a data storage device, the apparatus comprising a servo read assembly including two or more optical detection devices non-parallel to one another and spaced apart along a transducing direction, wherein the two or more optical detection devices detect passage of at least one optical indicator mark located on an adjacent magnetic disk.

12. The apparatus of claim 11, wherein each optical detection device includes one or more photodetectors.

13. An optical detection apparatus for use with a data storage device, the apparatus comprising a servo read assembly including two or more optical detection devices non-parallel to one another and spaced apart along a transducing direction, wherein the two or more optical detection devices detect passage of at least one optical indicator mark located on an adjacent magnetic tape.

14. The apparatus of claim 13 wherein the magnetic tape moves relative to the servo read assembly in the transducing direction and the servo read assembly further moves relative the magnetic tape in a translating direction generally perpendicular to the transducing direction, the apparatus further comprising detection circuitry for measuring a time period required for the at least one indicator to pass between the two or more detection devices.

15. The apparatus of claim 13 wherein the at least one optical indicator mark is a region of measurable optical contrast located on the magnetic tape.

16. The apparatus of claim 13, wherein each optical detection device includes one or more photodetectors.

17. An optical servo system for positioning a transducing head assembly adjacent a surface of a magnetic disk, the magnetic disk moving in a transducing direction relative to the transducing head assembly, the system comprising an optical detection apparatus for determining the position of the transducing head assembly relative to the magnetic disk in a translating direction transverse to the transducing direction, the optical detection apparatus including a first detection device and a second detection device, the first and second detection devices arranged in a substantially fixed, non-parallel relationship, wherein the first and second detection devices detect passage of at least one optical indicator mark located on the magnetic disk.

18. The system of claim 17 wherein the position of the optical detection apparatus is fixed relative to the transducing head assembly.

19. The system of claim 17 wherein the first detection device and the second detection device form substantially straight line segments.

20. The system of claim 17 wherein the optical detection apparatus further comprises an illumination source.

21. The system of claim 20 wherein the first detection device comprises a first photodetector and the second detection device comprises a second photodetector, the first and second photodetectors adapted to detect energy from the illumination source.

22. The system of claim 17 wherein the first detection device and the second detection device are configured in a V-shape pattern that is symmetric about a line parallel to the translating direction.

23. The system of claim 17 comprising a third detection device substantially identical in shape but offset in the transducing direction from either the first detection device or the second detection device.

* * * * *